Dec. 30, 1969     L. A. BERTONE     3,486,974
NUCLEAR REACTOR CONTROL ROD GRIPPING APPARATUS
Filed Oct. 10, 1967     2 Sheets-Sheet 1
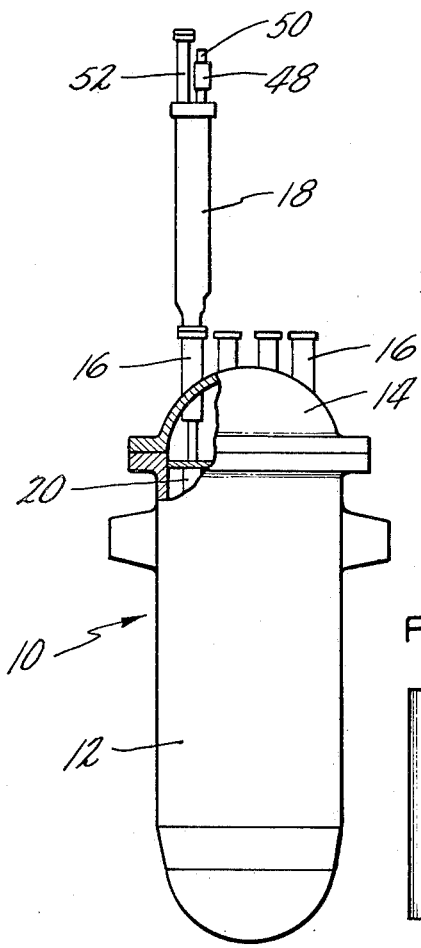
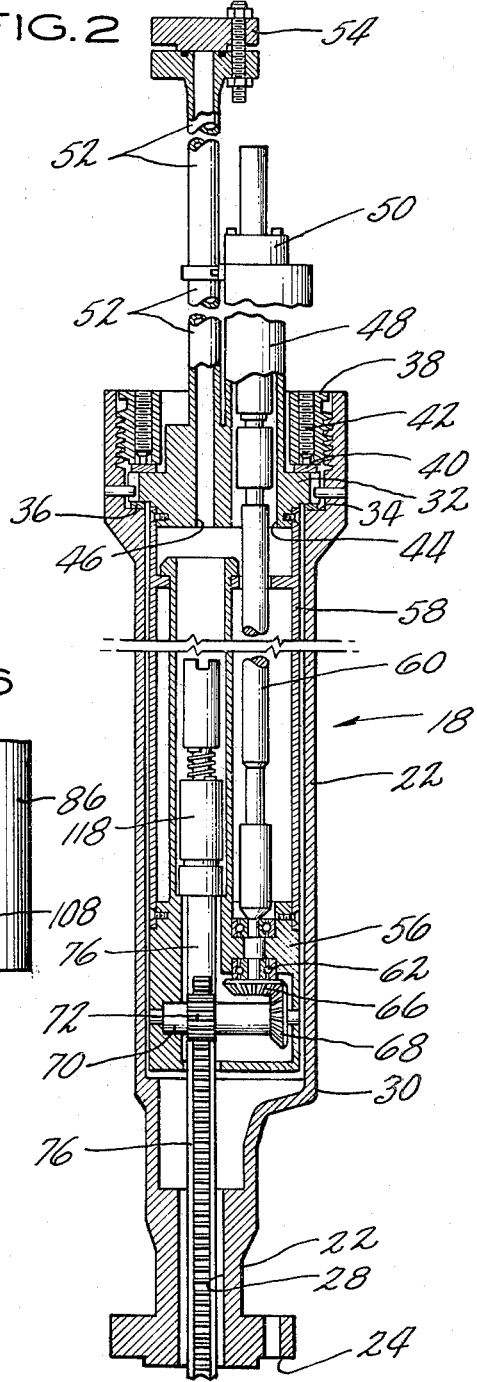
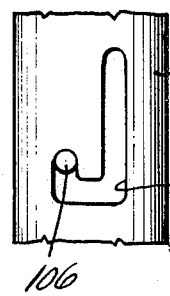
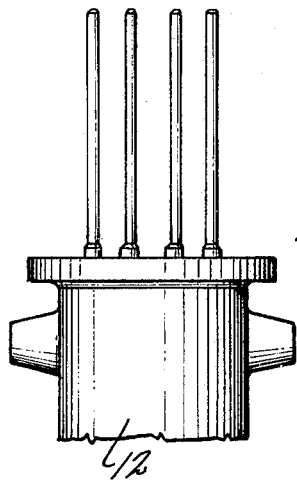
INVENTOR
LOUIS A. BERTONE
BY John F. Carney
ATTORNEY

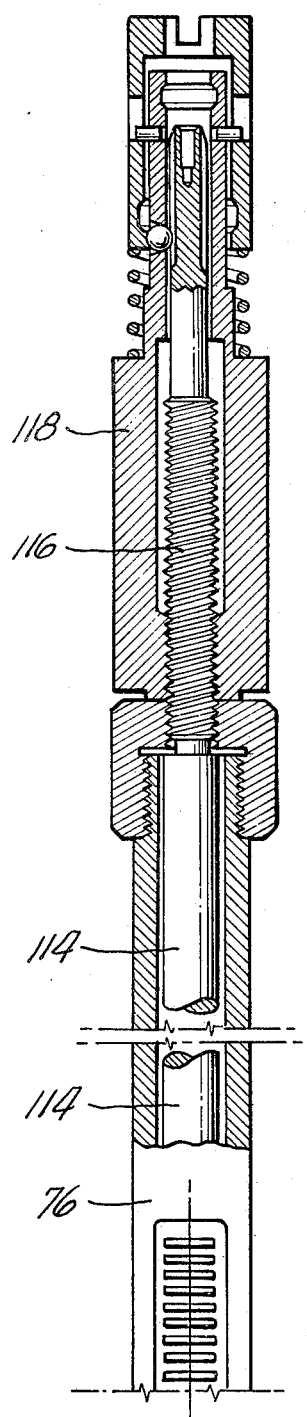
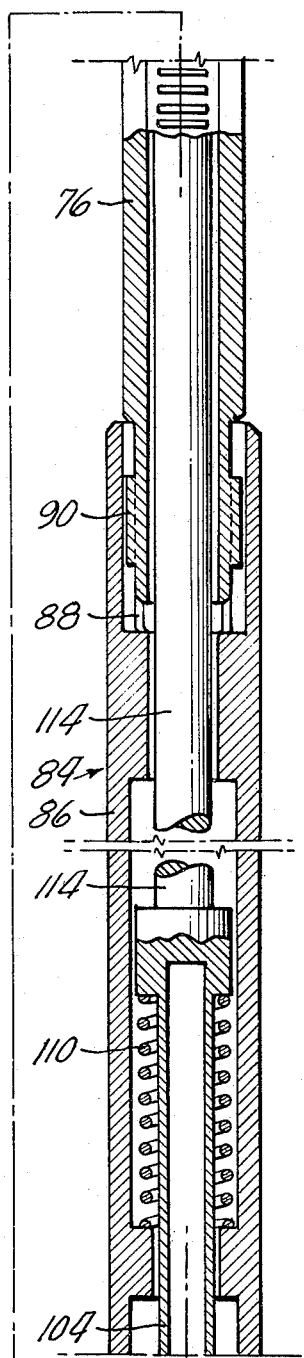
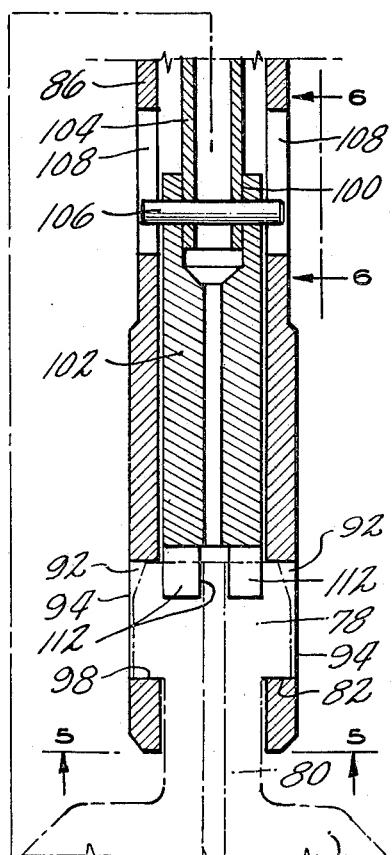
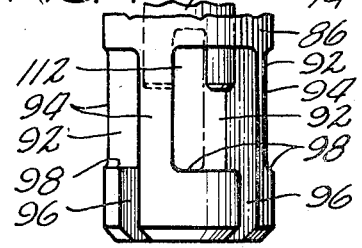
INVENTOR
LOUIS A. BERTONE
BY John F. Carney
ATTORNEY United States Patent Office 3,486,974
Patented Dec. 30, 1969

1

3,486,974
NUCLEAR REACTOR CONTROL ROD
GRIPPING APPARATUS
Louis A. Bertone, Tariffville, Conn., assignor to Combustion Engineering, Inc., Windsor, Conn., a corporation of Delaware
Filed Oct. 10, 1967, Ser. No. 674,208
Int. Cl. G21c 7/14
U.S. Cl. 176—36     7 Claims

ABSTRACT OF THE DISCLOSURE

A coupling device adapted especially for connecting a nuclear reactor control rod to its drive mechanism. The device releasably connects the control rod to the control rod-operating or ram portion of the drive mechanism. It includes a hollow body having a receptacle into which a retention head on the control rod is inserted. Surfaces within the receptacle form a shoulder engageable with a mating shoulder on the retention head upon relative rotation between the coupling assembly and the control rod. A releasable, spring biased latch member is provided to secure the members in coupled relation.

BACKGROUND OF THE INVENTION

The problem of connecting a first member to a second member at a remote point occurs in various situations. One such situation is in a nuclear reactor where the coupling and uncoupling of a control rod with its associated drive mechanism must be accomplished from a location remote from the point of connection.

As is generally well known, control rods are employed in a nuclear reactor for the purpose of controlling the reactivity rate of the reaction. Such control is important from the standpoint of regulating the output of the reactor and for effecting a safe shutdown either under normal operating conditions, or under "scram" conditions where rapid shutdown is required in order to prevent a reactor excursion. In general, many control rods are employed in a nuclear reactor and control is obtained by individually positioning the control rods relative to the fuel elements within the reactor core. Such positioning of each control rod is effected by means of an associated drive mechanism which connects to the control rod by means of a coupling device.

For various reasons it is often desirable to disconnect a control rod from its associated drive mechanism. Subsequently, of course, when it is desired to return the control rod to operation, it is necessary to reconnect it to its drive. Preferably, the coupling mechanism should be arranged so that both the disconnection and recoupling can be accomplished from a point located exteriorly of the reactor vessel without having to disassemble the control rod drive or withdraw the control rod from its inserted position within the reactor core. Heretofore, remotely located coupling devices of the type especially adapted for operation in nuclear reactors have embodied complex mechanisms that employ several moving parts. The number of precision parts required in such devices makes them both expensive to fabricate and also subject to fouling due to wear and deterioration. The subject invention is directed toward the elimination of such undesirable features in coupling devices of the described type.

SUMMARY OF THE INVENTION

The present invention is, therefore, directed to coupling apparatus operative to releasably connect the members of a control rod-drive mechanism assembly. This is accomplished by providing a coupling apparatus including a body having a receptacle cavity operative to engage and retain a mating head on the control rod. The receptacle cavity is made accessible to the mating control rod head through an opening in the leading end of the body that conforms to the shape of the mating head. Surface means within the cavity serve to engage complementary surfaces on the mating head upon relative rotation between these members. A remotely operated, spring biased latch mechanism is manipulated by means of an operator to effect or disengage the connection. This operator, which is in the form of an extension shaft, also serves as a means for connecting the coupling mechanism to the rack of a rack and pinion type drive mechanism and thereby effectively secures the control rod to the drive mechanism.

BRIEF DESCRIPTION OF THE DRAWINGS

FIGURE 1 is an elevational view, partly in section, illustrating a nuclear reactor incorporating the present invention;

FIGURE 2 is a vertical sectional view illustrating a control rod drive mechanism employed in the nuclear reactor of FIGURE 1;

FIGURE 3 is a vertical sectional view illustrating the rack and control rod coupling apparatus according to the invention;

FIGURE 4 is an end view of the coupling apparatus gripper head;

FIGURE 5 is a partial elevational view illustrating the gripping end of the coupling apparatus;

FIGURE 6 is a partial side elevational view illustrating the J-slot provided in the coupling apparatus; and FIGURE 7 is a view similar to FIGURE 1 illustrating the reactor with the vessel closure head and control rod drive mechanisms removed.

DESCRIPTION OF THE PREFERRED EMBODIMENT

Referring to FIGURE 1, there is shown a nuclear reactor 10 including a vertically arranged, cylindrical reactor vessel 12 having a generally hemispherical closure head 14. The closure head 14 attaches a plurality of upstanding nozzles 16 which communicate with the interior of the head and upon each of which is mounted a control rod drive assembly indicated as 18. In the drawing only one such drive assembly is shown. Control rod shrouds 20 are disposed within the reactor vessel 12 and house an associated control rod (not shown in the figure) which is vertically movable into and out of the active portion or core of the reactor by means of the drive mechanism incorporated in the assembly 18.

FIGURE 2 illustrates a typical drive assembly 18 including the control rod drive mechanism in greater detail. As shown, the assembly comprises a pressure housing 22 which is adapted to be mounted upon the nozzle 16 by means of a flanged connection indicated as 24. Suitable seals (not shown) may be employed to render the connection fluid tight. The pressure housing 22 comprises an elongated, generally cylindrical lower portion 26 having a concentrically disposed opening 28. Atop the lower portion 26 and in eccentric relation therewith is a cylindrical housing body 30 which is adapted to contain a portion of the control rod drive mechanism as hereinafter described. The upper end of the housing body 30 is closed by means of a closure plug 32 which is seated upon a plug seat 34 provided in the housing body and sealed by means of a sealing gasket 36 or the like. The closure plug 32 is retained in seated relation within the housing body 30 by means of a locking collar 38 threadably received within the upper end of the pressure housing 22 and which operates in conjunction with an annular washer 40 and compression screws 42 to force the plug into sealed, seated engagement upon the plug seat.

The closure plug 32 is further provided with a pair of spaced through-openings 44 and 46 that communicate with the interior of the pressure housing 22. The opening 44 communicates at its upper end with the pressure housing body 48 which contains appropriate braking and clutching mechanism for operating the drive motor and which mounts on its top a drive motor 50 as shown in FIGURES 1 and 2. The upper end of the opening 46 communicates with the interior of an open-ended, elongated access tube 52 formed integral with the closure plug 32 and which is closed at its upper end by means of a flanged closure plate 54. It is preferable to position the upper end of the access tube 52 such that it is easily accessible to workmen from a catwalk or other staging structure (not shown) which generally overlies the reactor and by means of which maintenance and inspection of each of the drive mechanisms are permitted.

The interior of the pressure housing body 30 contains a gear housing 56 disposed in axially spaced relation to the closure plug 32 and supportedly connected thereto by means of a support cylinder 58. A drive shaft 60 extends between the gear housing 56 and the braking and clutching mechanism contained in the upper housing body 48. The lower portion of the drive shaft 60 is rotatably secured within the gear housing 56 by means of appropriate bearing members 62. At the end of the drive shaft is attached a bevel gear 66 which drivingly operates a companion gear 68 mounted on a shaft 70. The shaft 70 is disposed at right angles to the drive shaft and mounts a pinion gear 72, the latter being operable to drive the control rod 74 (FIGURE 3) into and out of position within the reactor core by means of an elongated, hollow, cylindrical rack 76 that is connected to the control rod as hereinafter described.

The constructional details of the control rod 74, apart from the means for connecting it to the drive mechanism, are not a part of the disclosed invention and will not be described herein except to state that various constructions can be employed. According to the present invention, the control rod 74 is provided with a head 78, neck 80 and intermediate shoulder 82 which are cruciform in section. While in the disclosed embodiment the control rod 74 is cruciform in section throughout its entire length, for the purpose of the invention, only the head, neck and shoulders thereof need be so formed.

The coupling mechanism 84 employed to releasably attach the control rod 74 comprises an elongated, hollow, cylindrical coupling tube 86 having a splined socket 88 at its upper end adapted for engagement with a complementary splined head 90 on the lower end of the rack 76. Adjacent its lower end the coupling tube 86 is provided with four circumferentially spaced openings 92 that form a head-receiving cavity. The openings 92 are spaced apart by longitudinal struts 94 that form the sides of the openings. Slots 96 disposed at right angles to one another to form a cruciform passage extend from the cavity to the end of the coupling tube and are arranged such that they communicate with the openings 92 immediately adjacent the struts 94 thereby leaving the surfaces 98 that form the bottom of the openings continuous from an adjacent slot 96 at one end to a strut 94 at the other end. By means of this arrangement the coupling tube 86 can be extended over the head 78 over its associated control rod, the latter being caused to enter the cavity by alignment of the head with the cruciform passage formed by the slots 96. The arrangement is such that with the head 78 positioned in the cavity rotation of the coupling tube 86 with respect to the control rod 74 causes the shoulders 82 to engage the surfaces 98 of the openings 92 to thereby position the control rod head for locking.

Locking of the head 78 within the cavity of the coupling tube 86 is effected by means of a reciprocal plunger 100 that is here shown as being formed of two members, a leading portion 102 and an operating rod 104 connected together by means of a pin 106 whose ends extend outwardly from the leading portion to be received within a pair of diametrically opposed J-slots 108. By means of this arrangement the plunger 100 is guided in its movement between its "locked" and "unlocked" positions as hereinafter described. A spring 110 is disposed about the operating rod 104 and arranged to bias the plunger upwardly into its "unlocked" position. The lower end of the leading portion 102 is provided at 112 with crossed slots forming a cruciform recess adapted to receive the upper end of the control rod head 78. Through the action of the pin 100 operated in the J-slots 108, the cruciform recess 112 is aligned with the cruciform opening formed by the slots 96 when the pin is located in the vertical leg of the J-slot. Manipulation of the pin 106 through the horizontal leg of the J-slots causes the recess 112 to be located through approximately 50°, or an amount sufficient to angularly displace the recess and the control rod head 78 with which it is engaged from alignment with the slots 96 to a position whereby the shoulders 82 on the control rod head are in resting engagement on the surfaces 98. At the limit of the pins travel in the horizontal legs of the J-slots, depressions are provided to receive the pin through the urging of the spring 100, thus retaining the plunger 100 in its "locked" position.

Atop the upper end of the operating rod 104 is an extension shaft 115 that may be formed integral with the rod 104 or otherwise attached thereto. The extension shaft 114 is formed of a diameter to be slideably extended through and beyond the upper end of the coupling tube 86 and the rack 76. It has its upper end threaded as at 116 to receive a removable lock nut 118 adapted to attach the extension shaft to the rack. The details of the lock nut disclosed in the instant drawings are fully described in patent application Ser. No. 674,207, filed Oct. 10, 1967 to Walter H. Zinn and form no part of the present invention.

The operation of the coupling mechanism of the present invention is as follows. To grip a control rod seated on the bottom of the core of an open reactor vessel 12 within its shroud 20 in order to effect a connection between the control rod and its associated drive mechanism the assembled coupling mechanism 84, with the pin 106 located in the upper limit of the vertical leg of the J-slots 108 thereby placing the plunger 100 in its retracted or "unlocked" position, is inserted into the shroud with the cruciform passage 96 on the lower end of the coupling tube 86 receiving the head 78 of the control rod. The coupling mechanism is lowered until the top of the control rod head 78 abuts the upper end of the openings 92 which locate the head in the cavity formed by the openings. Thereafter, the extension shaft 114 is manipulated to lower the locking plunger 100 against the action of the spring 110. This manipulation is guided by the movement of the ends of the pin 106 in the J-slots 108. When the ends of the pin 106 bottom on the lower end of the vertical legs of the J-slots 108 the control rod head is received in the recess 112 formed on the leading end of the plunger. The extension shaft 114 is next located, this action being guided by the movement of the ends of the pin 106 in the horizontal legs of the J-slots 108. When this occurs, the control rod head 78 is retracted in the cavity with the shoulders 82 being moved to a position whereby they engage the surfaces 98 formed on the lower ends of the openings 92. The extension shaft 114 is then released and the ends of the pin 106 are forced into the depressions formed at the ends of the J-slots horizontal legs under the action of the spring 110 to place the plunger 100 and control rod head in the "locked" position. Because the pin is retained in the depressions, no relative rotational movement between the control rod head 78 and coupling tube 86 is permitted and because the shoulders 82 are in engagement with the surfaces 98 of the openings 92 no relative axial movement between the members can be effected.

This operation is repeated until coupling mechanisms are connected to all of the control rods 74 in the reactor after which the racks 76 can be placed over the exposed ends of the extension shafts 114 (FIGURE 7) with the splined head 90 on the lower end of the racks being brought into seated engagement within the splined socket 88 on the upper end of the coupling tube 86. The vessel head 14 containing the attached drive mechanisms 18 is then lowered into place. This locates the pinion gear 72 in operative position with respect to the rack 76. The connection is completed by threadedly connecting the lock nut 118 to the upper end of the extension shaft 114. This connection can be effected through the access tube 52 by torquing the nut to connect the rack to the extension shaft.

When it is desired to disassemble the reactor, the above operation is reversed.

It will be understood that various changes in the details, materials, and arrangements of parts which have been herein described and illustrated in order to explain the nature of the invention, may be made by those skilled in the art within the principle and scope of the invention as expressed in the appended claims.

What is claimed is:

1. A holding device for an article having at one end a head, a reduced neck and a shoulder therebetween, said head, neck and shoulder each being rectilinear in section, said holding device comprising:
    an elongated body having an enlarged cavity adjacent one end thereof;
    slot means having a sectional configuration to conform to the sectional shape of said head extending through said body from said cavity to said one end;
    an axial opening through said body extending from said cavity to the other end thereof;
    said cavity including surface means extending laterally of the axis of said body from said slot means for engaging said shoulder upon relative rotation between said body and said head;
    means associated with said surface means in angularly offset relation to the juncture of said slot means and said surface means for limiting the relative rotational movement between said body and said head;
    an axially and rotatably manipulatable plunger disposed in said axial opening and operable in said body in two positions, said plunger having means at one end for engaging said head and for urging it into abutting relation with said surface means in one position and for aligning it with said slot means in its other position;
    means for manipulating said plunger;
    and means for releasably retaining said plunger in each of its two positions.

2. A holding device as recited in claim 1 including:
    a plunger having a slot means in one end adapted for engagement with said head;
    a pin attached to said plunger;
    a J-slot disposed in said body having legs adapted to guidingly receive said pin;
    said legs of said J-slot being so disposed on said body as to present one leg adapted to position said pin such that the slot means in the end of said plunger are axially aligned with the slot means in said body with the plunger in its unlocked position and the other leg adapted to position said pin such that the slot means in the end of said plunger are axially aligned with said surface means with the plunger in its locked position;
    and an extension shaft connected to said plunger for manipulating it between its locked and unlocked position.

3. A holding device as recited in claim 2 including spring means for biasing said plunger into its unlocked position.

4. A holding device as recited in claim 3 wherein both of said slot means are cruciform in section for operation with an article having a head, neck and shoulder that is cruciform in section.

5. In combination, a nuclear reactor control rod, a drive mechanism and a holding device operative for releasably connecting the two, said combination comprising:
    a control rod a portion of which includes a neutron absorbing material, said control rod having at one end a head, a reduced neck and a shoulder therebetween, said head, neck and shoulder each being rectilinear in section,
    a drive mechanism including an elongated rack having an axial through-opening and a splined head at one end thereof,
    a holding device including:
        an elongated body having a splined recepticle at one end for reception of said splined head and an enlarged cavity at the other end thereof;
        slot means having a sectional configuration to conform to the sectional shape of said head extending through said body from said cavity to said other end;
        an axial opening through said body extending from said cavity to said splined recepticle;
        said cavity including surface means extending laterally of the axis of said body from said slot means for engaging said shoulder upon relative rotation between said body and said head;
        means associated with said surface means in angularly offset relation to the juncture of said slot means and said surface means for limiting the relative rotational movement between said body and said head;
        an axially and rotatably manipulatable plunger disposed in the axial opening in said body and being operable in said body in two positions, said plunger having means at one end for engaging said head and for urging it into abutting relation with said surface means in one position and for aligning it with said slot means in its other position;
        means for manipulating said plunger including an extension shaft connected thereto, said extension shaft extending through the axial through-opening in said rack above the top thereof;
        means for releasably retaining said plunger in each of said two positions;
        and means for releasably connecting said extension shaft to said rack at the top thereof.

6. The combination as recited in claim 5 wherein said holding device includes:
    a plunger having slot means in one end adapted for engagement with said control rod head;
    a pin attached to said plunger;
    a J-slot disposed in said body having legs adapted to guidingly receive said pin;
    said legs of said J-slot being disposed on said body to present one leg for positioning said pin such that the slot means in the end of said plunger are axially aligned with the slot means in said body with the plunger in its unlocked position and the other leg for positioning said pin such that the slot means in the end of said plunger are axially aligned with said surface means with the plunger in its locked position.

7. The combination as recited in claim 6 including spring means for biasing said plunger into its unlocked position.

References Cited

UNITED STATES PATENTS

| | | | |
|---|---|---|---|
| 2,252,767 | 8/1941 | Hudson | 294—86.21 |
| 2,792,251 | 5/1957 | Hayes | 294—92 |
| 2,894,779 | 7/1959 | Kushner et al. | 176—36 |
| 3,079,323 | 2/1963 | Hawke | 176—36 |
| 3,107,209 | 10/1963 | Frisch | 176—86 |
| 3,321,373 | 5/1967 | Challender | 176—36 |

LELAND A. SEBASTIAN, Primary Examiner

H. E. BEHREND, Assistant Examiner

U.S. Cl. X.R.

74—422; 294—92